Oct. 15, 1968　　　O. J. B. ORWIN ET AL　　　3,405,789
OVERLOAD CLUTCHES

Filed Nov. 30, 1966　　　　　　　　　　　　5 Sheets-Sheet 1

INVENTORS.
OLAF JOHN BARCLAY ORWIN
DEREK LAWRENCE GOLD
DAVID JOHN FORTUNE
BY Kurt Kelman
AGENT Oct. 15, 1968   O. J. B. ORWIN ET AL   3,405,789
OVERLOAD CLUTCHES Filed Nov. 30, 1966   5 Sheets-Sheet 3

INVENTORS.
OLAF JOHN BARCLAY ORWIN
DEREK LAWRENCE GOLD
DAVID JOHN FORTUNE
BY Kurt Kelman
AGENT

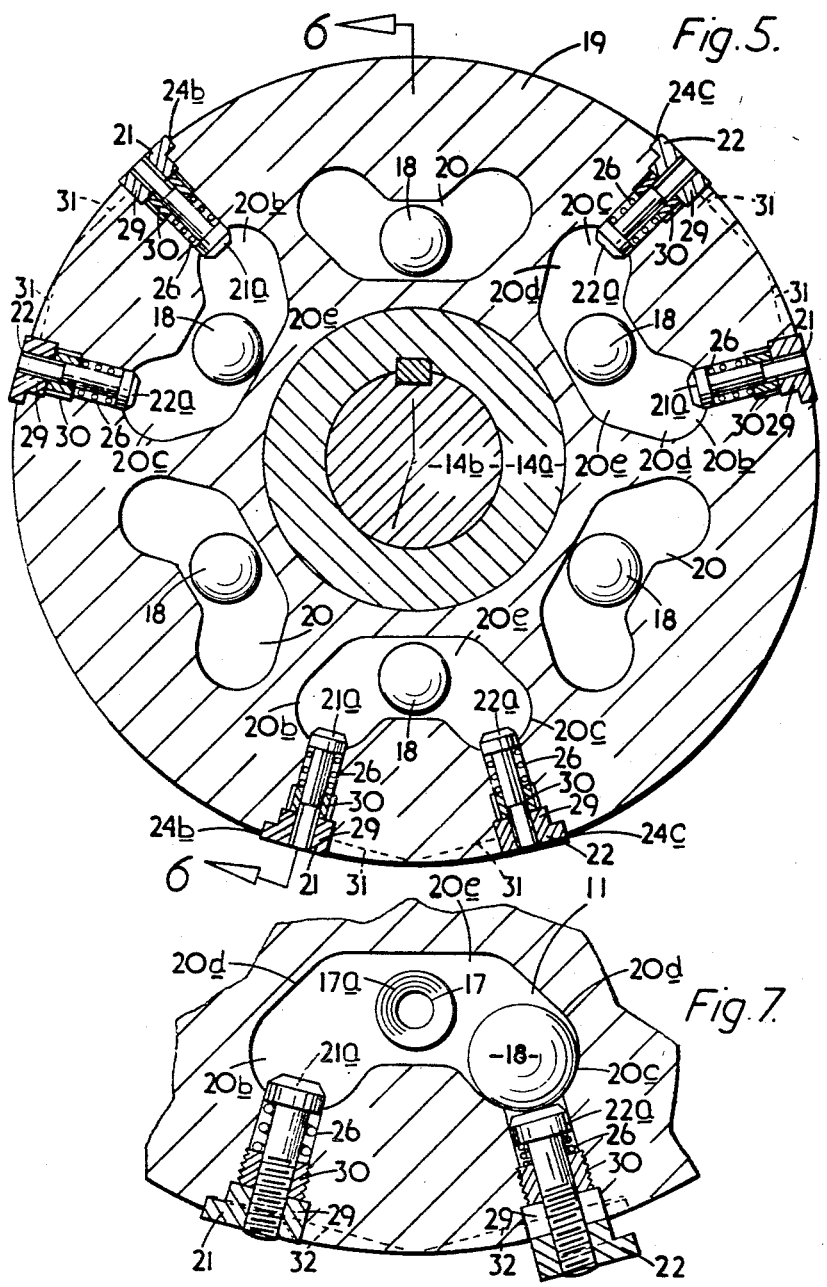

//! # United States Patent Office

3,405,789
Patented Oct. 15, 1968

3,405,789
OVERLOAD CLUTCHES
Olaf John Barclay Orwin, Birmingham, Derek Lawrence Gold, Cirencester, and David John Fortune, Bath, England, assignors to Fisholow Products Limited, Erdington, Birmingham, England, a British company
Filed Nov. 30, 1966, Ser. No. 598,105
Claims priority, application Great Britain, Dec. 2, 1965, 51,123/65; Jan. 11, 1966, 1,207/66
8 Claims. (Cl. 192—56)

ABSTRACT OF THE DISCLOSURE

In an overload, clutch, the ball cage is releasably locked to one of the two clutch members. A spring loaded release disassociates the cage from the one clutch member by the pressure of a ball against the release, the release projecting into the path of a ball moving in an associated slot in the cage, thus permitting the cage to rotate in a disengaging direction relative to the one clutch member. The ball cage and the one clutch member are connectable so as to restrain them from relative rotation when they turn opposite to the disengaging direction.

Background of the invention

This invention relates to overload clutches comprising driving and driven clutch members, each having a plurality of ball engaging torque transmitting openings, with the openings in one member being transversely opposite to those of the other member in one relative rotational position of the two members, so as to transmit torque from the driving to the driven member through torque transmitting balls disposed between the two members in engagement with the openings. Spring or other loading means urge the two members towards one another, and a ball guiding element is disposed between the two members. This element has a plurality of ball guiding slots, one portion of each of which slots constitutes a ball receiving portion adapted to be in register with a pair of torque transmitting openings when these are opposite to one another, with one end of each slot being out of register with the torque transmitting openings for all relative rotational positions thereof. A ball engaging side of each slot is intermediate its ball receiving portion and an end portion extends in a direction inclined to the circumferential direction, the balls having a diameter greater than the axial thickness of the element so as to project on opposite sides thereof into the torque transmitting openings. The arrangement is such that when more than a predetermined torque is applied to the clutch, the torque reaction from the balls on the two clutch members causes these to move relatively apart under the spring or other loading, so as to disengage the clutch, with the balls thereupon advancing along the inclined slots towards said one end thereof out of register with the torque transmitting openings.

One form of clutch of the foregoing kind is already known, in which the ball guiding element is connected non-rotatably to one of the two clutch members to rotate therewith. Such an arrangement possesses the important advantage that the ball receiving portion of each slot is permanently in register with the torque transmitting openings of the one clutch member to which is is permanently connected. Accordingly when, after overload has occurred, it is desired to re-engage the clutch, this can be done very simply by rotating the two clutch members relatively in a direction the reverse of that which obtains during overload, so as to bring the torque transmitting openings of the two members into register with one another, and at the same time advance the balls along the slots to the ball receiving portion thereof, so as to be in register with the torque transmitting openings.

This previously known arrangement does however entail the disadvantage that, when overload has occurred and the balls have advanced along the slots to the one end thereof which is out of register with the torque transmitting openings, because the ball guiding element is connected non-rotatably to the one clutch member, the balls will be in relative sliding engagement as opposed to simple rolling engagement with at least one of the two clutch members. Usually the balls will be in hard non-relatively rotatable engagement with the one end of the slots in the ball guiding element and clutch member connected thereto, while being in relatively slidable engagement with the other clutch member, so long as the two clutch members are rotating relatively. The above effect arises from the fact that, once the balls reach the one end of their respective slots, they are no longer free to roll relative to the opposed faces of the two clutch members, and since these are being urged towards one another under the pressure of the spring or other loading means, it follows that so long as the driving member of the clutch continues to be power rotated, rapid wear of the balls and the surfaces which are in relative slidable engagement therewith will occur, particularly if the torque loading is heavy, unless the power to the driving member is not quickly cut off after the clutch has disengaged, with the result that the useful life of the clutch will be limited.

Summary of the invention

The present invention has for its object the provision of an improved arrangement by which re-engagement of the clutch can be effected in a simple manner, but without subjecting the balls or the parts with which they engage to substantial wear, in the event the torque loading is heavy and the power to the driving member is not quickly cut off after clutch disengagement has occurred.

According to the present invention, the clutch is provided with a releasable locking device movable between a free position and a locking position in which it locks the ball guiding element releasably to one of the two clutch members to rotate therewith in a position in which the ball receiving portion of each of its slots is in register with one of the torque transmitting openings of said one clutch member, and the ball guiding element in association with at least one of the slots thereof, at a position spaced from said ball receiving portion is provided with a spring loaded release member adapted under its spring loading to project into the path of the ball which is advancing along the associated slot to one end thereof as a result of clutch disengagement, said release member being adapted to be displaced against its spring loading by the advancing ball, in a direction to displace the locking device into its free position so as to free the ball guiding element from the associated clutch member, and permit of said ball guiding element rotating in one direction (herein called the disengaging direction) relative to said one clutch member, with the power being still transmitted to the clutch, said ball guiding element and said one clutch member having interengageable connecting means adapted to restrain the ball guiding element, and said one clutch member against relative rotation, when said ball guiding element and said one clutch member turn in relation to one another in a relative direction opposite to said disengaging direction into a position in which the ball receiving portions at the slots are in register with the torque transmitting openings of the one clutch member to which the ball guiding element is releasably locked.

With a clutch according to this invention, the ball guiding element is still locked to the one clutch member when the balls commence to disengage from the torque transmitting openings and it is therefore unnecessary to provide special means such as a star cam to advance the balls positively to the out of register ends of the slots in the ball guiding element, while insofar as the ball guiding element is free to rotate relative to both clutch members when the balls reach the ends of the slots to move each associated locking device into its free position, wear of the balls and the parts with which they engage when at the ends of the slots is insignificant despite continued power rotation of the driving member of the clutch even under heavy torque loading.

An important feature of the overload clutch of this invention is that, when re-engagement of the clutch is required, not only is it unnecessary for the user specially to operate on the clutch by means of some suitable tool, so as temporarily to lock the ball guiding element against rotational movement relative to the one clutch member, while the two clutch members are rotated relative in a direction to re-engage the clutch, but furthermore all that the operator is required to do when re-engagement of the clutch is desired, is merely to rotate the two clutch members relatively in a relative direction which is opposite to the direction of relative movement which occurs between these parts following clutch disengagement; such reverse relative rotational movement having the effect of locking the ball guiding element to said one clutch member in the relative rotational position above mentioned, whereupon the operator continues reversely to rotate the one or the other clutch member until the torque transmitting openings of both clutch members are in register with one another.

Such reverse rotational movement of either of the two clutch members imparts a rolling motion to the balls which are in pressure rolling engagement with the two clutch members, causing the balls to advance along their respective slots towards the ball receiving portions thereof, but in a direction opposite to their direction of advance after overload disengagement. The balls advancing along the slots in this reverse direction will be in contact with the inclined ball engaging side of the slot, and will thus apply a reaction thrust thereto, causing the ball guiding element to rotate relative to the two clutch members to bring said element into such rotational position relative to the one clutch member as to become locked thereto in the relative rotational position above mentioned.

Thus, resetting of the clutch is effected by a one stage operation involving merely reverse rotation of either clutch member.

In particular, when one of the clutch members is first rotated in the reverse direction, it is unnecessary specially to hold the ball guiding element against rotational movement in relation to the one clutch member to which it is lockable.

Since such reversely rotated clutch member according to whether it is the driving member or the driven member, will be connected to a driving or driven shaft or the equivalent, this shaft or the equivalent can be turned in the direction described at a position which may be remote from the overload clutch.

Accordingly, it is unnecessary for the overload clutch to be disposed in some readily accessible position, to enable re-engagement thereof to be effected.

Detailed description of drawing

The invention is illustrated in the accompanying drawing wherein:

FIGURE 4 is a detail view to a larger scale of the construction of FIGURE 2, showing more clearly the form of the locking members, and depicting one of these in the free position.

FIGURE 5 is a cross-sectional side view of another embodiment of an overload clutch in accordance with this invention, the section being on the line 5—5 of FIGURE 6.

FIGURE 7 is a detailed view showing more clearly the form of the locking members of the construction shown in FIGURES 5 and 6, with one of the locking members being depicted in the free position.

Detailed description

Figure 1:
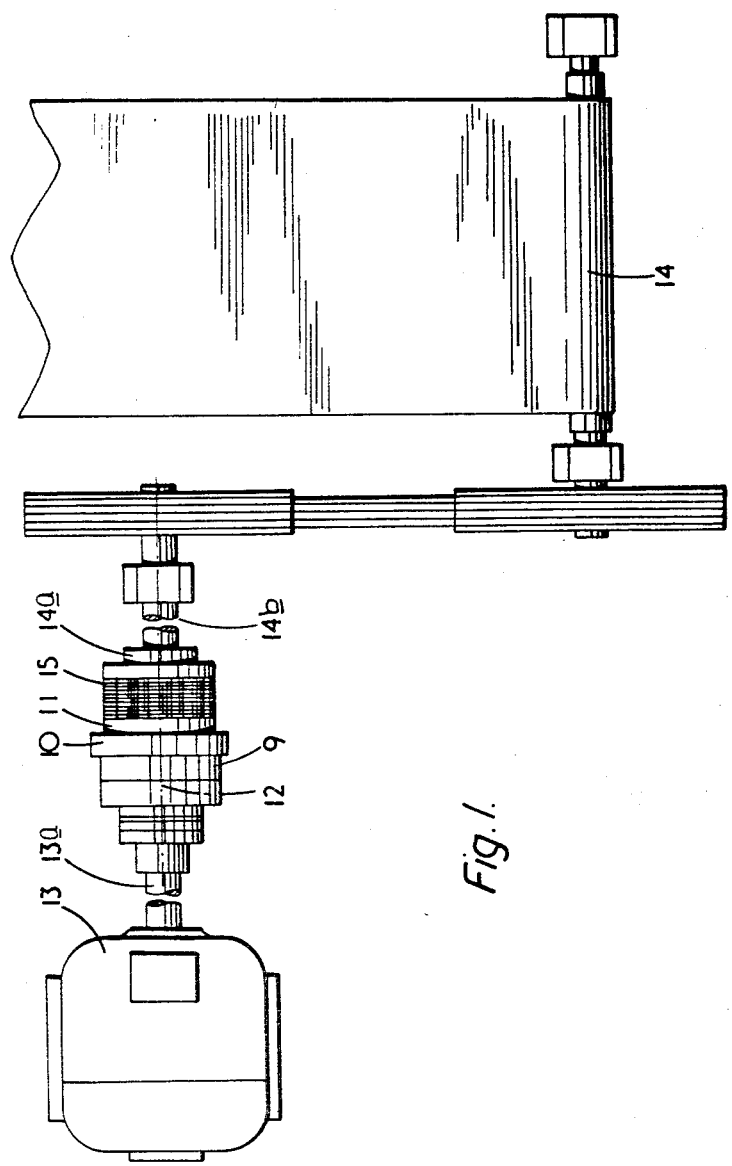
FIGURE 1 is a plan view of one form of overload clutch embodying this invention, and showing the connection of the driving and driven members to the power unit and driven part respectively.

Referring firstly to FIGURES 1 to 4, the overload clutch 9 there depicted comprises driving and driven clutch members 10, 11, each of annular disc-like configuration, and mounted for rotation about a common axis 12. The driving member 10 is connected to driving power unit 13 through driving shaft 13a, and the driven member 11 is connected to driven part 14, illustrated as a belt conveyor required to be power driven, the connection being through driven sleeve 14a and shaft 14b on which sleeve 14a the driving member 10 is supported for free rotation.

The driven member 11 is splined or keyed so as to be slidable axially thereof, and is resiliently urged towards member 10 by loading spring 15.

The driving and driven clutch members 10, 11 are each provided with two concentrically arranged circumferentially disposed sets of torque transmitting openings 16, 17, which in one relative rotational position of the two clutch members are in register with one another. Each set comprises twelve openings 16 and twelve openings 17, with the openings of the one staggered circumferentially in relation to the openings of the other set to equalize the torque loading on the two clutch members.

Each of these openings 16, 17 is in the form of a cylindrical bore, and has a coned mouth 16a, 17a, respectively, which has edge engagement with a torque transmitting ball 18 of a diameter larger than the diameter of the mouths 16a, 17a. Each ball 18 serves to transmit torque from one of the openings 16 of the driving member 10 to one of the openings 17 of the driven member 11.

Disposed between the disc-like driving and driven clutch members 10, 11 is an annular disc-like ball guiding element 19, which is capable of rotating freely relative to each of the two clutch members, such element having an axial thickness less than the diameter of each of the balls 18.

Figure 3:
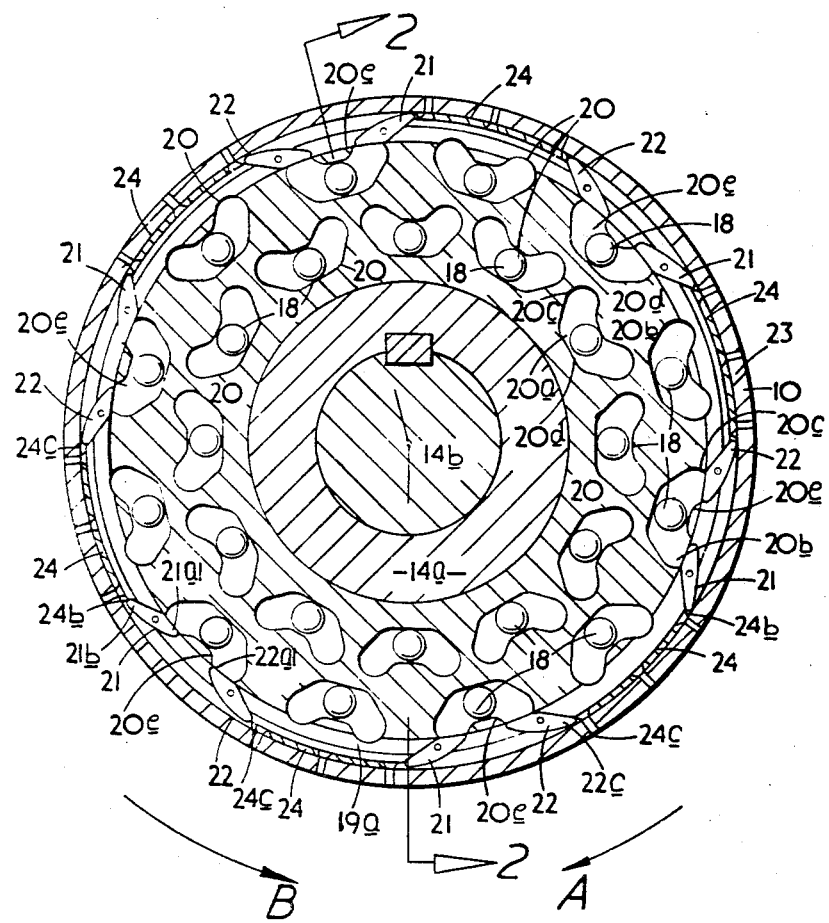
FIGURE 3 is a sectional view on the line 3—3 of FIGURE 2.
Figure 6:
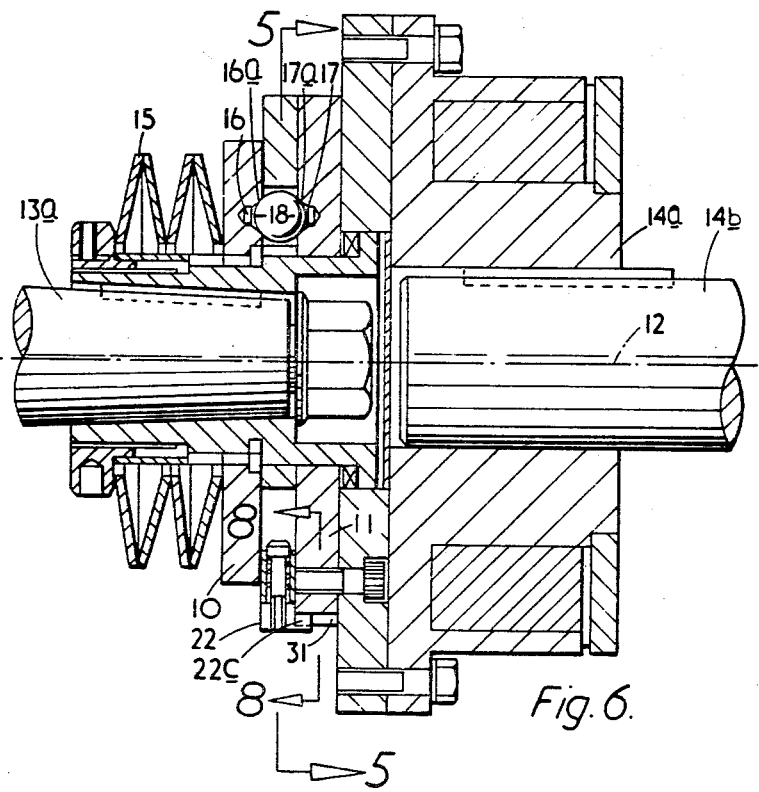
FIGURE 6 is a sectional view on the line 6—6 of FIGURE 5.

The ball guiding element 19 is formed, as shown in FIGURE 3, with two concentric sets of ball guiding slots 20; there being the same number of slots in each set as the openings 16, 17, with the slots in each set being similarly spaced.

Each slot 20 is of wide V configuration and accommodates one of the balls 18, and has a width slightly greater than the diameter of the ball 18, so that the same can advance freely along its associated slot.

Figure 2:
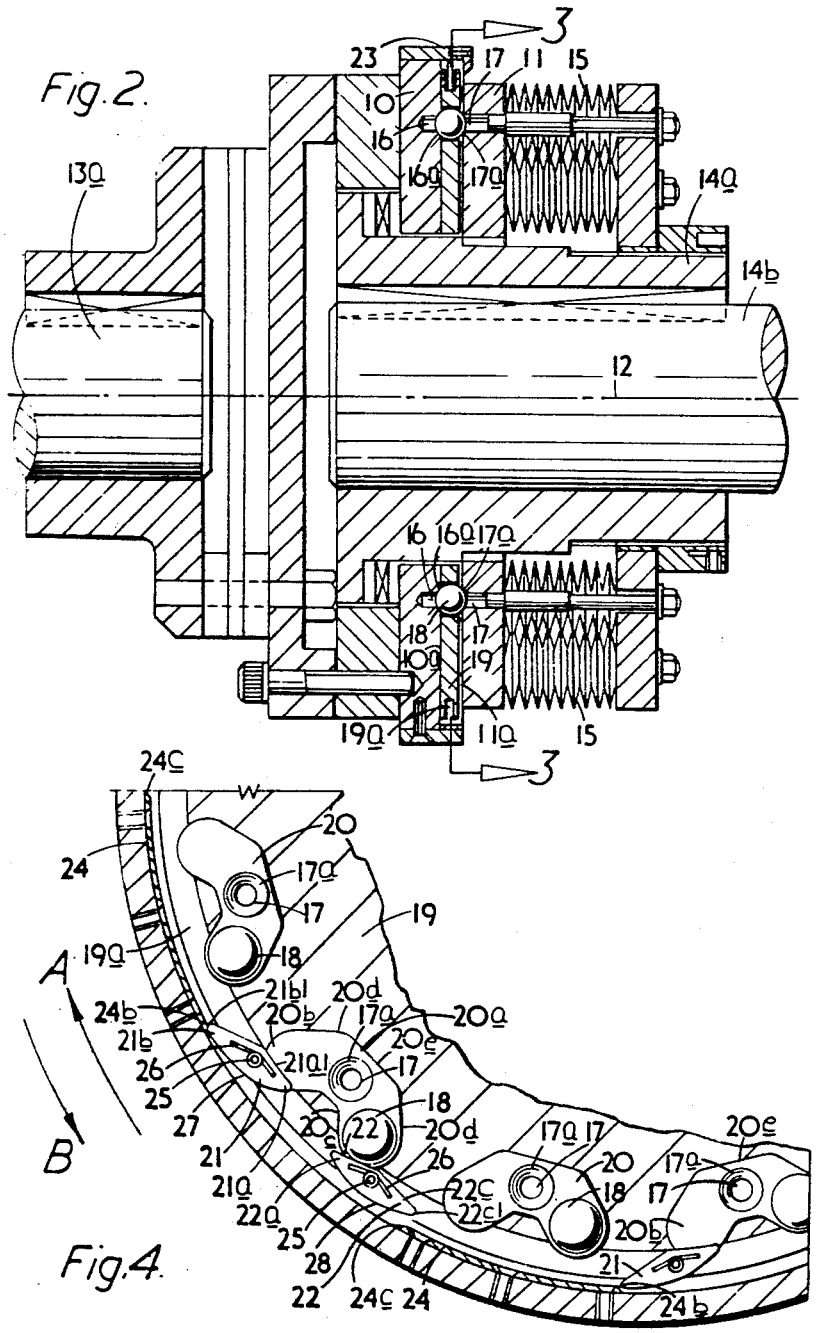
FIGURE 2 is a cross-sectional side view of the overload clutch depicted in FIGURE 1, the section being taken on the line 2—2 of FIGURE 3.

Each wide V-shaped slot 20 has a medial portion 20a, constituting a ball receiving portion which is adapted to register with an opening 16, 17, in each of the two clutch members, when such openings are in register with one another, as shown in FIGURE 2, and each slot 20 is further provided with a pair of end portions 20b, 20c, with each of the end portions of substantially closed configuration.

Each of these slots 20 at its medial portion 20a extends perpendicular to a radius line passing through the clutch axis 12 so that, on clutch disengagement, the balls 18 are free to roll along the slots in an initially circumferential direction corresponding to the direction of relative movement between the openings 16, 17 so that the rolling disengagement of the balls from the openings 16, 17 is facilitated. Since the slots 20 are V shaped, their sides 20d intermediate the ball receiving portions 20a and end portions 20b, 20c extend in a direction which is inclined to the circumferential direction and constitute ball engaging sides, with the two end portions 20b, 20c of each slot out of register with the torque transmitting openings 16, 17.

In association with respective end portions 20b and 20c of circumferentially alternate slots 20e of the outer set of slots, i.e. in association with six slots 20, are two sets of locking members 21, 22, which are housed within an annular groove 19a formed in the periphery of ball guiding element 19, which groove intersects the ends 20b and 20c of the radially outermost set of slots 20.

The driving member 10 is of a diameter larger than that of the ball guiding element 19, and at its outer periphery is provided with an axially directed flange 23, which extends annularly around the periphery of the element 19 in spaced relation thereto. This flange carries on its inner periphery six locking abutments 24 spaced symmetrically around the clutch axis.

Each of these locking abutments 24 is of arcuate configuration, and formed at each end with an abutment face 24b, 24c.

Each of the locking members 21, 22 is formed as a two armed lever pivoted to the ball guiding element 19 on fulcrum pins 25 which extend between opposite sides of groove 19a so that the axis of pivoting is parallel to the clutch axis 12.

One of the two arms of each locking member constitutes a respective locking arm 21b, 22c adapted respectively for locking engagement with abutment faces 24b and 24c. Each locking arm forms with each abutment 24 a locking device for releasably locking the ball guiding element 19 to the driving member 10.

As will be seen, the locking arms 21b of the locking members 21 extend in a direction from their respective pivots which is opposite to that of the locking arms 22c.

Thus referring to FIGURES 3 and 4, the locking arms 21b and 22c serve to lock the ball guiding element 19 against rotation relative to the clutch member 10 in a clockwise and counter-clockwise direction, respectively, as denoted by arrows A and B.

Each locking arm 21b, 22c has an abutment engaging face 21b1, 22c1, see FIG. 4 of a width slightly less than that of the abutment faces 24b, 24c, respectively, the arrangement being such that the locking members can each be swung about their respective pivots 25 out of engagement with the abutment faces 24b, 24c, by swinging them in a clockwise direction as viewed in FIGURE 3 in the case of the members 21, and in a counter-clockwise direction in the case of the members 22, so as to move respectively from the illustrated full line locking position depicted in FIGURE 3 and the lefthand side of FIGURE 4, into the free position shown in the righthand side of FIGURE 4.

Springs means 26 are provided for urging the locking members from their free positions into their respective locking position.

The other arm 21a, 22a, of each locking member 21, 22 respectively constitutes a ball engaging arm, and with the locking members in their operative or locking position is adapted partially to project into one side of each slot 20 near the end portions 20b in the case of the locking members 21, and near the end portions 20c in the case of the locking members 22.

Each of these ball engaging arms 21a, 22a (see FIG. 3) is formed with a ball engaging face 21a1, 22a1, which is inclined in relation to the adjacent length of the slot 20.

The arrangement is accordingly such that, when overload occurs and, under the torque transmitted between the balls and the openings 16, 17, the clutch member 11 moves away from the clutch member 10 against loading spring 15, the balls 18 are now advanced initially in a circumferential direction, and finally to one end or the other (according to the direction of clutch rotation), of their respective slots. When the clutch disengages in this way, the balls will be in a rolling engagement with the opposed faces 10a, 11a of the two clutch members 10, 11, which faces are of plane configuration and are mutually parallel. Since these two clutch members are being urged towards one another by spring 15, the balls 18 will be positively urged to roll along their respective slots by the fact that the power driven driving member 10 is now overrunning the driven member 11.

As a result, the balls 18, as they reach the ends of the slots, will exert appreciable pressure on the inclined faces 21a1 or 22a1, as the case may be, of the ball engaging locking member arms 21a, 22a; thus, according to the direction of clutch rotation, swinging these locking members 21 or 22 about their pivots into the disengaged position, in which their abutment engaging faces 21b1, 22c1, as the case may be, are out of engagement with abutment faces 24b, or 24c. Such ball engaging arms 21a, 22a accordingly constitute locking device release members.

Referring to FIGURE 3, if the driving member 10, together with the ball guiding element 19 still locked thereto is rotating in a clockwise direction, as denoted by arrow A, relative to the now stationary driven member 11, the balls will roll along relative to slots 20 in a direction towards the ends 20c thereof, so as to engage with the arms 22a of locking members 22, thereby allowing ball guiding element 19 to turn in a counter clockwise direction relative to clutch member 10, and balls 18 to roll in a counter clockwise direction relative to member 10, so as to have the required free rolling engagement.

Under these conditions, the locking members 21 are not engaged by the balls at all, and to permit the aforementioned relative movement between element 19 and member 10, the outer faces of the locking arms 21b are chamfered at 27 to permit them to ride over the abutment faces 24c, without interfering with the required relative rotational movement.

If, on the other hand, the direction of rotation of driving member 10 and ball guiding element 19 still locked thereto is counter clockwise, as denoted by arrow B in FIGURE 3, then after overload has occurred and driven member 11 is stationary, the balls 18 will roll relative to their respective slots in a direction towards the ends 20b thereof, so as to engage with the arms 21a, and permit ball guiding element 19 together with the balls 18 to advance in a clockwise direction relative to member 10, so as similarly to permit of the continued free rolling movement of the balls.

To permit of this latter relative rotational movement, the outer faces of the locking arms 22c are chamfered at 28, so as to ride over the abutment faces 24b.

In order that the clutch may be re-engaged after the driving member 10 has been brought to rest, it is necessary to re-connect the ball guiding element 19 to the clutch member 10 in a position in which, as shown in FIGURES 2 and 3, the medial or ball receiving portions 20a of the slots 20 are in register with the torque transmitting openings 16 of member 10. For this purpose, there are provided interengageable means between the clutch member 10 and the ball guiding element 19 adapted to connect the latter to the clutch member 10 when the clutch member 10 is turned relative to the ball guiding element 19 in a direction opposite to the direction of relative rotation between these two parts, after the balls 18 have rolled to the one end of each of their slots to free the adjacent locking members.

As shown, these connecting means are constituted by the locking members 21, 22, and their respective abutment faces of abutments 24.

Thus, assuming that the driving member 10 is normally rotating in the direction of arrow A in FIGURE 3, so that the locking members 22 will be engaged by the balls 18 after overload has occurred, the locking members 21 and associated abutment faces 24b then constitute the interengageable connecting means so that, when in the clutch re-engaging operation hereinafter described the driving member 10 is rotated relative to the ball guiding element 19 in a direction the reverse of arrow A, locking members 21 will engage with abutment faces 24b to prevent further relative rotation in this direction when the ball receiving portions 20a of slots 20 are in register with torque transmitting openings 16. If on the other hand, the direction of rotation of the driving member 10 is as denoted by the arrow B in FIG. 3, then the members 22 with their associated abutment faces 24c now act as the aforementioned connecting means during clutch engagement.

When re-engagement of the clutch is required, after disconnection of the power drive from the power unit 13 to the driving member 10, the latter or the driven member 11 are rotated in a direction such as to produce a relative rotation between the two clutch members 10, 11, which is opposite to the direction of relative rotation which occurs between these members following clutch disengagement. Thus if the driving member 10 is now rotated to re-engage the clutch, it is turned in a direction opposite to its normal direction of driving. As earlier explained, the above mentioned reverse relative rotation of the driving and driven members 10, 11, can be effected by turning driving shaft 13a or driven sleeve 14a at some position remote from the clutch itself, which is an important advantage of this invention.

The effect of this reverse relative rotation of the two clutch members 10, 11, is to cause the balls 18 to roll in a direction opposite to that obtaining during clutch disengagement, i.e. to roll away from the adjacent end 20b or 20c, as the case may be, of slots 20, and in so doing to engage with the adjacent inclined edge 20d of the adjacent end portion of the slot, thus imparting torque to the freely rotatable ball guiding elements 19, to turn this relative to driving member 10, in a direction opposite to the direction of relative rotation between member 10 and element 19, which obtains after clutch disengagement. As a result, the ball guiding element 19 is turned relative to member 10 by a distance such that the one or the other of the two sets of locking devices 21, 22, functioning as above described as the interengageable connecting means, now engage respectively with abutments 24b or 24c, to connect or latch the ball guiding element 19 to the driving member 10 in a position in which the ball receiving portions 20a of the slots 20 are in register with the opening 16 of member 10. As the aforementioned reverse relative movement of the two clutch members is continued, the parts will reach a position in which the balls 18 and the torque transmitting openings 16 and 17 are in register with one another, and the clutch will re-engage under the loading of spring 15.

Referring now to FIGURES 5 to 8 of the drawings, there is here depicted an alternative embodiment of this invention which is similar to the embodiment just described, except that the locking members 21, 22 are in the form of plungers which are mounted for radial sliding movement within cylindrical bores 29, disposed radially in relation to the clutch axis 12, with the inner end of each bore communicating with one of the two end portions 20b, 20c of circumferentially alternate V-shaped ball guiding slots 20.

As shown in FIGURE 5, only one set of these slots 20 are provided in the ball guiding element 19, with circumferentially alternate slots 20e having associated therewith two of these cylindrical bores 29, each accommodating a locking member 21, 22, as the case may be.

The radially inner end 21a, 22a, of each of these locking members is made of larger diameter than the adjacent part of the locking member, and is urged by spring 26 into an inner and locking position, as depicted in FIGURE 5, in which the enlarged inner end 21a, 22a respectively projects into end portion 20b and 20c of slot 20e, so as to be engageable by a ball 18 advanced to one or other end portion of the slot.

Each spring 26 acts between the adjacent larger diameter locking member end 21a or 22a and a sleeve 30 secured within the interior of bore 29, with which interior of the sleeve the locking member is in slidable engagement.

Figure 8:
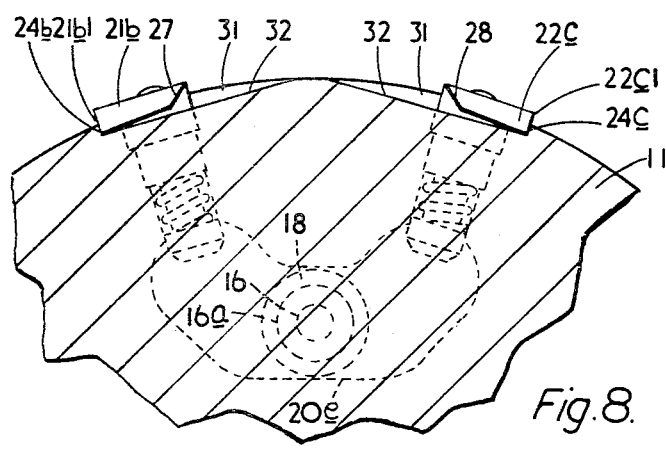
FIGURE 8 is a detail sectional view on the line 8—8 of FIGURE 5, and drawn to a larger scale.

Each locking member 21, 22, at its outer end is formed with an arm 21b, 22c, which, as shown in FIGURE 8, extends in a direction substantially parallel to the clutch axis 12. One side face 21b1, 22c1 of each locking member arm 21b, 22c extends radially in relation to the clutch axis, and is engageable with a locking abutment 24b, 24c constituted by a radially extending end face of a wedge-shaped recess 31, a plurality of which are provided corresponding in number to that of the locking members, and each formed in the circular periphery of the disc-like driven clutch member 11.

The locking member arms 21b, 22c and locking abutments 24b, 24c constitute locking devices, one or the other of which, according to the direction of clutch rotation, also constitutes interengageable means connecting the ball guiding element 19 to the driven member 11, in the torque transmitting position, as described in connection with the preceding construction.

Each wedge-shaped recess 31 embodies an outwardly directed face 32, which merges with the circular periphery of the driven clutch member 11, being inclined at a small angle of the order of 5° to 10° to such periphery. The wedge-shaped recesses 31 are arranged in pairs, each pair being operably associated with two locking members 21, 22, each themselves associated with one of the aforementioned slots 20e. The two wedge-shaped recesses 31 of each pair have their aforementioned inclined faces 32 oppositely inclined with the abutment faces 24b, 24c of each pair of recesses 31 oppositely directed towards one another, as shown in FIGURE 8.

In addition, the opposite side faces 27, 28 of locking member arm 21b, 22c are chamfered in manner corresponding to the first described embodiment and for the same purpose, i.e. so as to permit the two locking members 21, 22 associated with each of the several slots to be displaced radially outwardly to disengage their respective locking arms 21b, 22c from the driven clutch member 11, and thus permit the ball guiding element 19 to rotate freely for either direction of clutch rotation.

Thus, if the driving member 10 is rotating in a clockwise direction in FIGURE 5, and the balls 18 disengage from openings 16, 17, they will advance relative to element 19 in a counter-clockwise direction to the ends 20c of the slots 20, thus displacing the locking members 22 into their outer and free position, as depicted in FIGURE 7, and permitting the ball guiding element 19 to rotate in a counter-clockwise direction relative to the driven member 11. This relative rotation in such direction is permitted by the fact that the arms 21b of the locking members 21 and which are not engaged by the balls are able, by reason of their chamfered or inclined sides 27, to ride over the abutment faces 24c as well as to ride over the adjacent inclined faces 32 of the wedge-shaped recesses 31 in driven member 11.

In the event of the direction of rotation of the driving member being counter-clockwise as viewed in FIGURE 5, when overload occurs the balls will advance to the ends 20b of their respective slots to engage and displace the locking members 21 into their free position, and allow the ball guiding element 19 to turn in a clockwise direction relative to the driving member, whereupon locking member arms 22c by reason of their inclined sides 28 will similarly ride over abutment faces 24b of driven member recesses 31.

Re-setting of the clutch with this last described construction is effected in the same way as the construction first described.

In order to prevent the plunger-like locking members 21, 22 from turning about their respective axes, by reason of the arms 21b, 22c extending parallel to the clutch axis, these plunger-like locking members and the cylindrical bores 29 are formed locally of non-circular cross-section.

If desired, the loading spring 15 of each of the constructions described may be replaced by loading means in the form of a plunger working within a liquid, e.g. an oil containing cylinder of maximum bore substantially larger than that of the piston and serving by the small compression of the liquid thus obtained as another form of resilient loading means.

What we claim then is:

1. An overload clutch comprising two clutch members each of which defines a respective set of torque transmitting openings; a ball guiding element between the clutch members and defining a set of slots having a ball receiving portion; a ball in each of said slots; a releasable locking device movable between a free position and a locking position in which it locks the ball guiding element releasably to one of the two clutch members to rotate therewith in a position in which the ball receiving portion of each of said slots is in register with one of the torque transmitting openings of said one clutch member; a spring loaded release member on the ball guiding element in association with at least one of the slots thereof, at a position spaced from said ball receiving portion and adapted to be spring-biased to project into the path of the ball advancing along the associated slot to one end thereof as a result of clutch disengagement, said release member being adapted to be displaced against its spring bias by the advancing ball in a direction to displace the locking device into its free position so as to free the ball guiding element from the one clutch member, and to permit said ball guiding element to rotate in a disengaging direction relative to said one clutch member; and interengageable connecting means between said ball guiding element and said one clutch member adapted to restrain the ball guiding element and said one clutch member against relative rotation when said ball guiding element and said one clutch member turn in relation to one another in a relative direction opposite to said disengaging direction into a position in which the ball receiving portions of the slots are in register with the torque transmitting openings of the one clutch member to which the ball guiding element is releasably locked.

2. The overload clutch of claim 1 and adapted to operate in either direction of rotation, comprising at least two of said locking devices and associated release members, each locking device and release member being operable by movement of one of said balls towards one end of one of said slots for one of the two directions of clutch rotation, the arrangement being such that for either direction of clutch rotation one of the two locking devices is operable by said ball movement and the other of the two locking devices constitutes said interengageable connecting means.

3. The overload clutch of claim 2, wherein each ball guiding slot has its ball receiving portion disposed medially between two opposite end portions of the slot, so that the clutch is equally effective for either direction of rotation of the driving member, and wherein one end of at least one slot in the ball guiding element, and the rotational opposite end of at least one slot in the ball guiding element are respectively provided with said locking devices and associated release members, one of each of said locking devices being effective in locking the guiding element against rotation in one direction relative to the one clutch member, and the other one of said locking devices being effective in locking the ball guiding element against rotation in the opposite direction relative to the one clutch member.

4. The overload clutch of claim 1, comprising a plurality of said locking devices, each comprising a one-piece locking member having a release member connected integrally thereto.

5. The overload clutch of claim 4, wherein each locking member is a two-armed lever supported for pivoting movement on the ball guiding element, one arm of said lever being adapted to project into one end of the corresponding slot, and the other arm of said lever being adapted for locking engagement with an abutment face on the one clutch member.

6. The overload clutch of claim 4, wherein each locking member is a spring loaded plunger mounted for sliding movement within the ball guiding element between an operative position in which one end of the plunger extends within an adjacent end of one of the slots in the ball guiding element and an arm on the other end of the plunger in locking engagement with one of a plurality of locking abutment faces on the one clutch member, and a free position in which the plunger is displaced by ball engagement against its spring loading to bring said arm clear of said one abutment face.

7. The overload clutch of claim 1, wherein the clutch is arranged to operate in either direction of rotation, the locking device including a locking member disposed adjacent each of two end portions of selected ones of said slots, the locking members having abutment engaging arms associated with abutments being respectively disposed in mutually opposite directions, the arrangement being such that one or the other of the two locking members associated with each slot is effective according to the direction of clutch rotation.

8. The overload clutch of claim 7, wherein the abutment engaging arm of each locking member at the side thereof, spaced from its abutment engaging face, is so shaped as to permit of the locking member freely riding over the clutch member abutments for one of the two directions of relative rotation between the ball guiding element and the one clutch member with which the locking members co-act.

No references cited.

BENJAMIN W. WYCHE, III, *Primary Examiner.*

L. J. PAYNE, *Assistant Examiner.*